June 23, 1936. L. E. LA BRIE 2,044,990

BRAKE

Filed Feb. 20, 1933 3 Sheets-Sheet 1

INVENTOR.
LUDGER E. LA BRIE
BY
*Jn. W. McConkey*
ATTORNEY

June 23, 1936.  L. E. LA BRIE  2,044,990

BRAKE

Filed Feb. 20, 1933  3 Sheets-Sheet 2

INVENTOR.
LUDGER E. LA BRIE
BY
*Jn. W. McCauley*
ATTORNEY

June 23, 1936.    L. E. LA BRIE    2,044,990
BRAKE
Filed Feb. 20, 1933    3 Sheets-Sheet 3
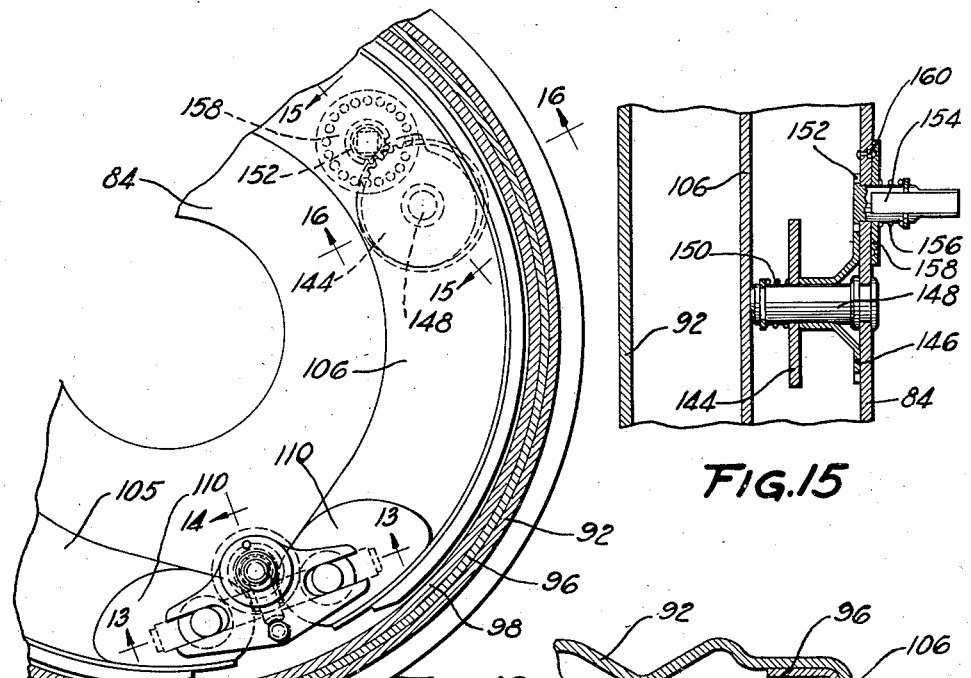
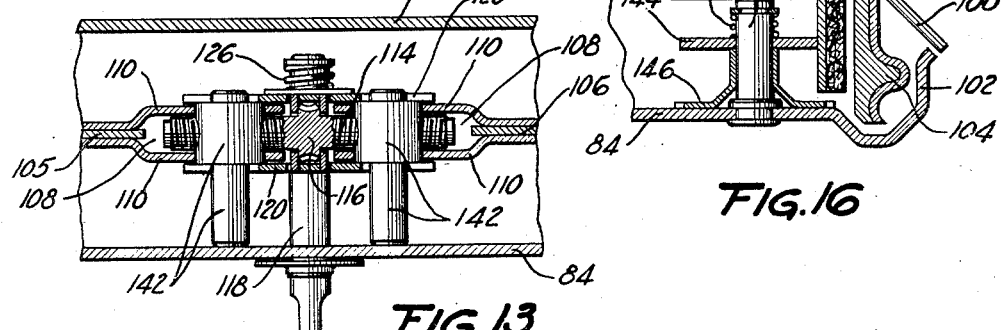
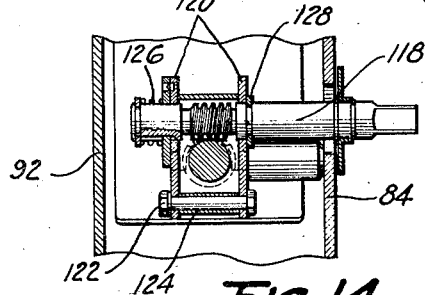
INVENTOR.
LUDGER E. LA BRIE
BY
ATTORNEY Patented June 23, 1936

2,044,990

UNITED STATES PATENT OFFICE 2,044,990

BRAKE

Ludger E. La Brie, South Bend, Ind., assignor to Bendix Aviation Corporation, South Bend, Ind., a corporation of Delaware Application February 20, 1933, Serial No. 657,693

4 Claims. (Cl. 188—78)

This invention relates to brakes, and is illustrated as embodied in an internal expanding automobile brake of the shiftable-anchorage type.

An object of the invention is to provide an improved brake assembly of this type, including a pair of adjustably-connected shoes actuated by a lever or the like pivoted on one shoe and connected by an adjustable compression link to the other, and with the webs of the shoes formed with openings embracing a pair of brake anchors and arranged to slide radially (and preferably also to rock slightly) on the anchors. Various of the parts of this brake also embody in themselves, and in their construction and arrangement, features of novelty pointed out below.

Other features of the invention relate to a novel positioning device for one of the shoes, to an improved yielding centering device for the brake, to a novel drum arrangement and to other novel combinations of parts and desirable particular constructions which will be apparent from the following description of the illustrative embodiments shown in the accompanying drawings, in which:

Figure 12 is a sectional view, corresponding to part of Figure 1, showing another modification;

Figure 13 is a partial section on the line 13—13 of Figure 12, showing the brake adjustment;

Figure 14 is a partial section on the line 14—14 of Figure 12, and also showing the adjustment;

Figure 15 is a partial section on the line 15—15 of Figure 12, showing a novel shoe-positioning device; and Figure 16 is a partial section on the line 16—16 of Figure 12, showing the said shoe-positioning device.

Figure 1:
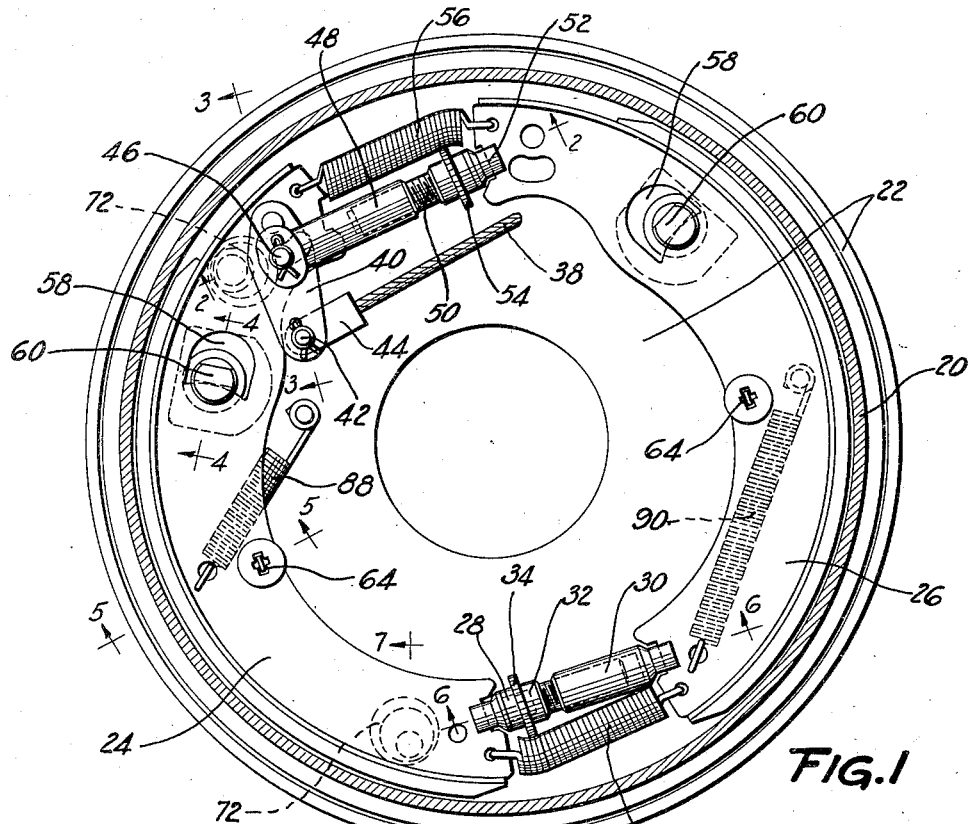
Figure 1 is a vertical section through the brake, just inside the head of the brake drum, with the brake shoes shown in side elevation.
Figure 5:
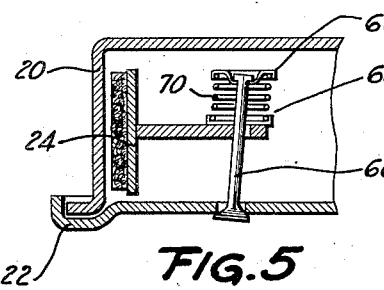
Figure 5 is a partial section on the line 5—5 of Figure 1, showing a spring steady rest.

The brake shown in Figure 1 includes a rotatable drum 20, at the open side of which is arranged a support such as a stamped steel backing plate 22, and within which is arranged the friction means of the brake. The illustrated friction means includes a pair of floating shoes 24 and 26 each of which is T-shaped in section (see for example Figure 5) and has a stiffening web and an outer cylindrical rim faced with brake lining.

Figure 6:
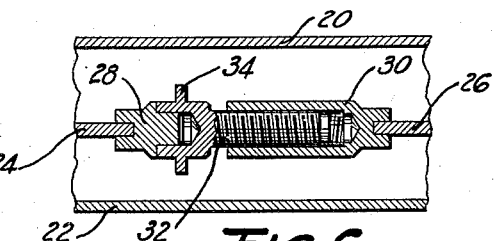
Figure 6 is a partial section on the line 6—6 of Figure 1, showing the adjustable connection between the shoes.

The shoes are adjustably connected at their lower ends, for example by a pair of members 28 and 30, the latter being a threaded socket receiving the threaded end of an adjusting member 32 which has at its other end a smooth socket journaled on the member 28 (see Figure 6). Member 32 has a collar 34, preferably formed with teeth for engagement with a suitable tool, such as a screw driver, inserted through an opening in the backing plate to adjust the brake.

Members 28 and 30 are formed with pairs of lugs, as shown in Figure 6, embracing the ends of the shoe webs between them. A spring 36 tensioned between the shoes holds them against the adjustment, and also engages collar 34, yieldingly to lock the adjustment.

Figure 3:
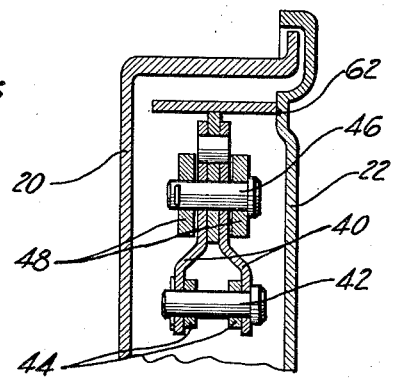
Figure 3 is a partial section on the line 3—3 of Figure 1, showing the mounting of the brake-operating lever.

The brake may be operated by means such as a Bowden type of control, the cable or other tension element 38 of which extends through the backing plate into the closed brake chamber formed by the drum and backing plate, and is connected to the brake-applying device. The illustrated applying device includes a lever 40 made up, as shown in Figure 3, of a pair of stampings connected at their lower ends by a pivot 42 to a fitting 44 on the end of the cable.

Figure 2:
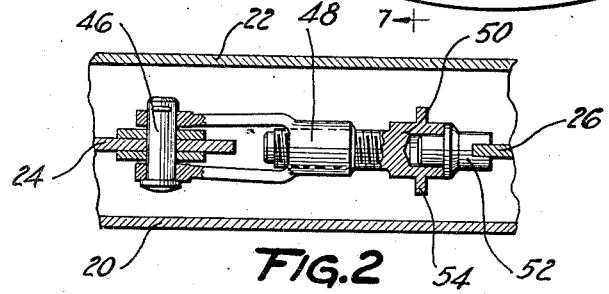
Figure 2 is a section on the line 2—2 of Figure 1, showing a part of the brake-operating means.

An intermediate part of the lever is connected, by means such as a pivot 46, to a threaded socket member 48 adjustably receiving the threaded stem of an adjusting member 50. The adjusting member 50 has in its end a smoothbore socket journaled on the cylindrical end of a member 52 having lugs (Figure 2) embracing between them the end of the web of shoe 26.

The adjusting member 50 is shown with a toothed collar 54 by which it can be turned to adjust the applying means. Members 48—50—52 form in effect an adjustable compression link connecting the lever 40 and the shoe 26. A return spring 56 may be tensioned between the ends of the shoes above this adjustable link.

Figure 4:
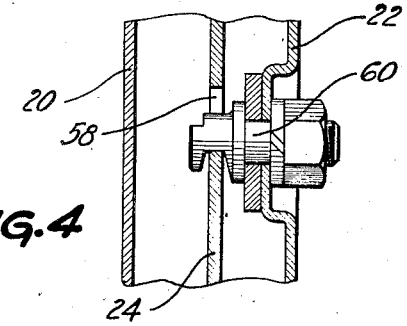
Figure 4 is a partial section on the line 4—4 of Figure 1, showing one of the brake anchors.

Each shoe is formed with an opening 58 in its web, through which passes an anchor in the form of a fixed post 60 carried by the backing plate (see Figure 4). Each anchor has a flat radial surface slidably engaged by the approximately straight lower edge of its opening 58. I prefer, however, that this edge be not exactly straight but slightly curved, so that the shoe may rock slightly as well as slide on the anchor. An anchorage of this character has previously been disclosed and broadly claimed by me in my application No. 626,423, filed July 30, 1932.

The shoes may be urged against flattened bosses 62 (Figure 3) formed on the backing plate, by suitable spring steady rests or the like 64. In the form shown in Figure 5, the steady rest includes a stem 66, having a rounded head rockably engaging the edge of an opening in the backing plate, and passing through an opening in the shoe web. Stem 66 carries at its end a stamped washer 68, between which and the shoe web is arranged a coil spring 70.

Figure 7:
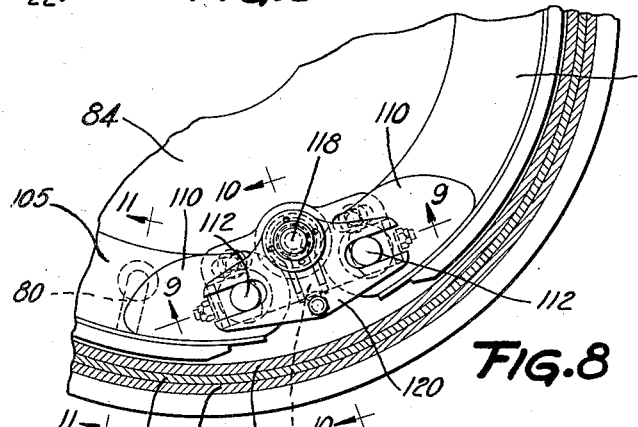
Figure 7 is a partial section on the line 7—7 of Figure 1, showing a shoe-positioning device.

The opposite ends of the rim of shoe 24, in the released position of the brake, are shown as engaging shoe-positioning devices 72, shown in detail in Figure 7. This form of positioning device includes an angularly-adjustable stem 74, normally locked in adjusted position by a lock-nut 76, and which passes through the backing plate so that it is adjustable from outside the brake. Inside the brake, stem 74 has an eccentric portion carrying a roller 78 engaging the inner face of the shoe rim.

Figure 8:
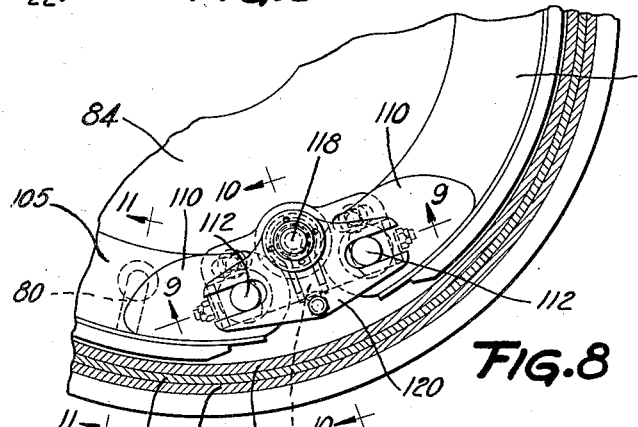
Figure 8 is a partial section through a modified form, corresponding to the lower part of Figure 1.
Figure 11:
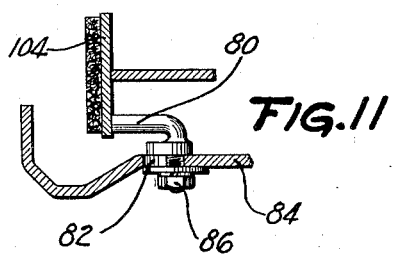
Figure 11 is a sectional view corresponding to Figure 7, and showing a different type of shoe-positioning device.

As shown in Figures 8 and 11, in place of the above-described device I may substitute a right-angled stop 80, adjustable in a radial slot 82 in a novel backing plate 84, and locked in adjusted position by a lock-nut 86.

Shoe 24 is urged against the anchor 60, and the two positioning devices 72, by an inclined return spring 88 tensioned between the shoe web and the backing plate. Shoe 26 is urged to a released position determined by anchor 60, and by its upper and lower adjustable compression-link connections to shoe 24, by an inclined return spring 90 tensioned between the lower end of the shoe web and the backing plate.

In the modification of Figures 8–11, the brake includes, in combination with the backing plate 84, a novel drum including a stamping 92 having a cylindrical flange 94 within which is seated and secured a steel shell 96 containing a centrifugally-cast iron liner 98.

The drum is flared outwardly beyond the flange 94, to form a coaxial flange 100 of larger diameter arranged edge to edge with respect to a corresponding flange 102 formed on the edge of the backing plate. The liner 96—98 bridges across the annular joint between the flanges 100 and 102, and is preferably formed with a rib 104 almost sealing the space between the liner and the flange 102 (i. e. sealing it except for the necessary and unavoidable clearance).

In the brake of Figures 8–11 the shoes 105 and 106, corresponding to shoes 24 and 26, have at their lower ends sockets 108 formed by registering grooves in stampings 110 spot-welded to the webs of the shoes. Stampings 110 also carry transverse pivots 112 having central threaded openings adjustably receiving oppositely-extending right-and-left threaded stems formed on an adjusting member 114.

Member 114 is shown centrally formed with a worm wheel 116 meshing with and driven by a worm formed on a cross-shaft 118, floating with the above-described adjustable joint, and the end of which extends outside the backing plate and is there formed to be grasped by a wrench. Shaft 118 is journaled in two end plates 120, slotted to be mounted on the reduced-diameter ends of the pivots 112 and held by a clamp bolt 122 (Figure 10) and spacer sleeve 124 mounted thereon between the end plates.

Figure 10:
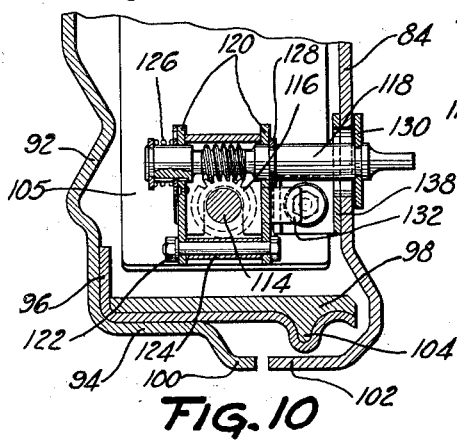
Figure 10 is a partial section on the line 10—10 of Figure 8, showing part of the adjustment, and showing the novel drum arrangement.
Figure 9:
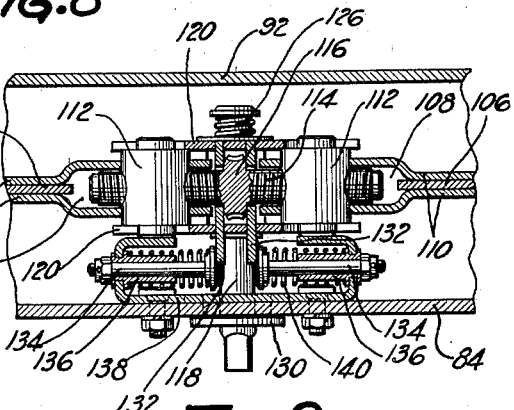
Figure 9 is a partial section on the line 9—9 of Figure 8, showing the adjusting and centering means of the modification.

Shaft 118 is yieldingly held in place by a spring 126, confined between the outer end plate 120 and a snap-ring in the end of the shaft, the spring urging the shaft to the left in Figure 10 until a snap-ring 128 carried by the shaft engages the second end plate 120. The shaft 118 also carries a washer 130 covering an enlarged opening in the backing plate through which the shaft projects.

The end plates 120 are also formed with openings receiving lugs formed on two washers 132 mounted on the adjusting member 114 on opposite sides of the worm wheel 116. Two lugs 132 on these washers project some distance through the end plate, toward the backing plate 84, and form part of a novel spring centering device. These lugs 132 project between, and are engaged by enlarged collars on the ends of, stems or plungers 134 slidably mounted in guide sleeves 136.

Sleeves 136 are fixed in oppositely-facing sockets formed in a stamping 138 bolted or otherwise fixedly mounted on the backing plate. Plungers 134 are encircled by coil springs 140 confined between the collars on the adjacent ends of the plungers, and the bases of the sockets in the stamping 138. Springs 140 are compressed sufficiently so that, whenever the brake is released, they will act through plungers 134 on the lugs 132 to center the shoes.

In the arrangement of Figures 12 to 16, the construction is substantially the same as just described except that the spring centering device is omitted and the reduced-diameter ends of pivots 142 (corresponding to pivots 112) are extended for sliding supporting engagement with the backing plate.

This embodiment also includes an alternative form of shoe-positioning device shown in detail in Figures 15 and 16. This device includes a cam-shaped or eccentric-edged roller 144 engaging the inner face of the shoe rim, and having welded or otherwise secured thereto the hub of a stamping 146 having a base engaging the backing plate. The roller 144, with the attached operating member 146, is sleeved on a pin 148 riveted to the backing plate and having its end in supporting engagement with the side of the shoe web. A spring 150 is compressed between roller 144 and a snap-ring in the end of pin 148.

The base of member 146 is formed with teeth meshing with the teeth of a small pinion 152 formed or mounted on an operating shaft 154 extending through the backing plate and formed to be grasped by a wrench or the like. A spring 156 sleeved on the shaft 154 is compressed between a snap-ring on the shaft and a locking washer 158 keyed on the shaft. Washer 158 is formed with an annular series of openings yieldingly engageable, against the resistance of spring 156, with a locking projection 160 carried by the backing plate.

While several illustrative embodiments have been described in detail, it is not my intention to limit the scope of the invention to those particular embodiments, or otherwise than by the terms of the appended claims. It is not my intention to claim in the present application any of the subject-matter disclosed in my prior application No. 626,423, filed July 30, 1932. The brake shoe illustrated is not herein claimed per se, as this shoe forms the subject-matter of my divisional application No. 694,213, filed October 19, 1933. The shoe-positioning and centering means, and the adjustable eccentric stop, are claimed in my divisional applications Nos. 40,291 and 40,292, both filed September 12, 1935.

I claim:

1. A brake comprising a pair of floating shoes adjustably connected at their ends and each having a web formed with an opening, a fixed anchor for each shoe arranged in the opening and having a flat side arranged radially of the brake, the edge of each opening formed on a slight curve engaging the flat side of the corresponding anchor to permit sliding of the shoe on the anchor radially of the brake and to permit also a slight rocking of the shoe on the anchor, an operating lever pivoted on the unconnected end of one shoe and having a tension operating connection extending exteriorly of the brake, and an adjustable compression link connecting said lever with the unconnected end of the other shoe.

2. A brake comprising a pair of floating shoes adjustably connected at their ends and each having a web formed with an opening, a fixed anchor for each shoe arranged in the opening and having a flat side arranged radially of the brake, the edge of each opening formed on a slight curve engaging the flat side of the corresponding anchor to permit sliding of the shoe on the anchor radially of the brake and to permit also a slight rocking of the shoe on the anchor, an operating lever pivoted on the unconnected end of one shoe and having a tension operating connection extending exteriorly of the brake, and a link connecting said lever to the unconnected end of the other shoe.

3. A brake comprising a pair of floating shoes adjustably connected at their ends and each having a web formed with an opening, a fixed anchor for each shoe arranged in the opening and having a flat side arranged radially of the brake, the edge of each opening being formed for radial sliding engagement with the flat side of the corresponding anchor to permit sliding of the shoe on the anchor radially of the brake, an operating lever pivoted on the unconnected end of one shoe and having a tension operating connection extending exteriorly of the brake, and an adjustable compression link connecting said lever with the unconnected end of the other shoe.

4. A brake comprising a pair of floating shoes adjustably connected at their ends and each having a web formed with an opening, a fixed anchor for each shoe arranged in the opening and having a flat side arranged radially of the brake, the edge of each opening being formed for radial sliding engagement with the flat side of the corresponding anchor to permit sliding of the shoe on the anchor radially of the brake, an operating lever pivoted on the unconnected end of one shoe and having a tension operating connection extending exteriorly of the brake, and a link connecting said lever to the unconnected end of the other shoe.

LUDGER E. LA BRIE.